(12) United States Patent
Shi

(10) Patent No.: US 10,382,189 B2
(45) Date of Patent: Aug. 13, 2019

(54) METHOD, APPARATUS AND SYSTEM FOR MULTI-CARRIER OFDM DUPLEX TRANSMISSION

(71) Applicant: Huawei Technologies Co., Ltd., Shenzhen (CN)

(72) Inventor: Cao Shi, Shenzhen (TW)

(73) Assignee: Huawei Technologies Co., Ltd., Shenzhen (CN)

( * ) Notice: Subject to any disclaimer, the term of this patent is extended or adjusted under 35 U.S.C. 154(b) by 897 days.

(21) Appl. No.: 14/319,894

(22) Filed: Jun. 30, 2014

(65) Prior Publication Data

US 2014/0314071 A1     Oct. 23, 2014

Related U.S. Application Data

(63) Continuation of application No. PCT/CN2011/085213, filed on Dec. 31, 2011.

(51) Int. Cl.
*H04L 7/027* (2006.01)
*H04B 7/06* (2006.01)
*H04L 25/03* (2006.01)
*H04L 27/26* (2006.01)
*H04B 3/23* (2006.01)

(52) U.S. Cl.
CPC .............. *H04L 7/027* (2013.01); *H04B 3/232* (2013.01); *H04B 7/068* (2013.01); *H04L 25/03343* (2013.01); *H04L 27/2626* (2013.01); *H04L 27/2627* (2013.01); *H04L 27/2657* (2013.01)

(58) Field of Classification Search
None
See application file for complete search history.

(56) References Cited

U.S. PATENT DOCUMENTS

| | | | |
|---|---|---|---|
| 5,864,592 A * | 1/1999 | Itri | H04J 3/0676 375/220 |
| 6,931,084 B1 | 8/2005 | Eberlein et al. | |
| 2001/0021219 A1 | 9/2001 | Sasaki et al. | |
| 2005/0063323 A1 | 3/2005 | Schenk | |
| 2005/0089127 A1 * | 4/2005 | Nagaraja | H04L 27/2662 375/354 |

(Continued)

FOREIGN PATENT DOCUMENTS

| CN | 1303561 | 7/2001 |
|---|---|---|
| CN | 1802828 | 7/2006 |

(Continued)

*Primary Examiner* — Brandon M Renner
*Assistant Examiner* — Manuel Rangel
(74) *Attorney, Agent, or Firm* — Slater Matsil, LLP

(57) ABSTRACT

Embodiments of the present invention provide a method, an apparatus, and a system for multi-carrier OFDM duplex transmission, and relate to the communications field, so as to solve the problem where spectrum duplex transmission cannot be normally performed due to interference that is generated by an echo signal transmitted by using an OFDM technology. The method for multi-carrier OFDM duplex transmission includes: performing, on at least one OFDM subcarrier channel, sending and receiving of a near-end OFDM signal; obtaining a carrier phase difference between a near-end echo OFDM signal and a far-end OFDM signal; and performing a phase adjustment for the near-end OFDM signal according to the carrier phase difference.

20 Claims, 3 Drawing Sheets

(56) References Cited

U.S. PATENT DOCUMENTS

| | | | |
|---|---|---|---|
| 2006/0098748 A1 | 5/2006 | Yeh et al. | |
| 2006/0120267 A1 | 6/2006 | De Bart et al. | |
| 2006/0252398 A1* | 11/2006 | Park | H04B 1/525 455/296 |
| 2007/0009017 A1* | 1/2007 | Lin | H04L 5/1423 375/219 |
| 2008/0187129 A1* | 8/2008 | Lu | H04B 3/237 379/406.06 |
| 2009/0185650 A1* | 7/2009 | Ravid | H04B 7/0617 375/376 |
| 2010/0046738 A1* | 2/2010 | Schelstraete | H04B 3/32 379/406.01 |
| 2010/0290333 A1* | 11/2010 | Lin | H04B 3/32 370/201 |
| 2011/0170633 A1 | 7/2011 | Avril et al. | |
| 2011/0261865 A1* | 10/2011 | Chen | H04L 25/03057 375/220 |
| 2012/0044053 A1* | 2/2012 | Jung | G06K 7/0008 340/10.1 |
| 2012/0063492 A1* | 3/2012 | Palanki | H04W 56/001 375/211 |
| 2013/0114468 A1* | 5/2013 | Hui | H01Q 3/2611 370/277 |

FOREIGN PATENT DOCUMENTS

| | | |
|---|---|---|
| CN | 101895488 | 11/2010 |
| CN | 101923157 | 12/2010 |
| CN | 102227878 | 10/2011 |
| WO | 9517046 A1 | 6/1995 |

\* cited by examiner

METHOD, APPARATUS AND SYSTEM FOR MULTI-CARRIER OFDM DUPLEX TRANSMISSION

This application is a continuation of International Application No. PCT/CN2011/085213, filed on Dec. 31, 2011, which is hereby incorporated by reference in its entirety.

TECHNICAL FIELD

The present invention relates to the communications field, and in particular, to a method, an apparatus, and a system for multi-carrier orthogonal frequency division multiplexing duplex transmission.

BACKGROUND

OFDM is an orthogonal frequency division multiplexing technology. In fact, the OFDM is one type of MCM (multi-carrier modulation). Its main idea is to divide a channel into several orthogonal subcarriers, convert a high-speed data signal into parallel low-speed data subflows, and modulate them onto the subcarriers for transmission. Orthogonal signals may be separated at a receiver end by using a related technology, thereby reducing mutual ISI (inter-symbol interference) between the subcarriers. Other features such as high bandwidth usage and simple implementation enable the OFDM to be more widely applied in the field of radio communications. For example, a WLAN (wireless local area network) system, a WiMAX system based on orthogonal frequency division multiple access (OFDMA), and a fourth-generation mobile telecommunications system (4G) are all systems based on the OFDM technology.

An OSD (overlapped spectrum duplex) technology refers to a technology in which a spectrum overlapping technology is used in both an uplink and a downlink to send and receive a signal. The OSD technology enables uplink and downlink signals to multiplex all bands completely at the same time, which is expected to double spectrum efficiency compared with a traditional FDD (frequency division duplex) or TDD (time division duplex) mode. However, as a transmission distance becomes shorter, a channel delay becomes smaller, and a signal sent by a near-end device and a signal received by a far-end device are almost completely orthogonal to each other in terms of time. However, in an OFDM system, subcarrier signals of orthogonal frequency division signals sent by the near end and the far end are not completely synchronous. As a result, an echo OFDM signal that has passed through a hybrid coil is not synchronous with a far-end OFDM signal, which causes severe interference to the received signal.

SUMMARY

Embodiments of the present invention provide a method, an apparatus, and a system for multi-carrier OFDM duplex transmission. A carrier phase adjustment performed for a sent orthogonal frequency division multiplex signal prevents a problem where an echo signal is not completely synchronous with an OFDM signal of a received signal sent from a far-end device, and helps implement overlapped spectrum duplex transmission in an OFDM duplex transmission system.

To achieve the foregoing purpose, the following technical solutions are adopted in the embodiments of the present invention.

In an embodiment, a method for multi-carrier OFDM duplex transmission comprising simultaneously performing, by a near-end device, on at least one OFDM subcarrier channel, sending of a near-end OFDM signal and receiving of a far-end OFDM signal sent from a far-end device, is provided. A carrier phase difference between a near-end echo OFDM signal and the far-end OFDM signal is obtained according to the near-end echo OFDM signal generated from the sent near-end OFDM signal and according to the received far-end OFDM signal. A carrier phase adjustment is performed for the near-end OFDM signal according to the carrier phase difference, or sending, by the near-end device, the carrier phase difference to the far-end device by using a carrier phase difference notification message, so that the far-end device performs a carrier phase adjustment for the far-end OFDM signal according to the carrier phase difference, so as to ensure that a carrier phase of the near-end echo OFDM signal is synchronous with a carrier phase of the far-end OFDM signal.

In another embodiment an apparatus for multi-carrier OFDM duplex transmission comprising a sending unit, configured to perform, on at least one OFDM subcarrier channel, sending of a near-end OFDM signal, is provided. A receiving unit is configured to perform, on at least one OFDM subcarrier channel, receiving of a far-end OFDM signal sent from a far-end apparatus. An obtaining unit is configured to obtain a carrier phase difference between a near-end echo OFDM signal and the far-end OFDM signal according to the near-end echo OFDM signal generated from the sent near-end OFDM signal and according to the received far-end OFDM signal. A first adjustment unit is configured to perform a carrier phase adjustment for the near-end OFDM signal according to the carrier phase difference, so that the near-end echo OFDM signal is synchronous with the far-end OFDM signal.

In yet another embodiment a system for multi-carrier OFDM duplex transmission comprising a near-end apparatus and a far-end apparatus is provided. The near-end apparatus comprises a sending unit, a receiving unit, an obtaining unit, a first adjustment unit, and a message transmission unit, where the sending unit is configured to perform, on at least one OFDM subcarrier channel, sending of a near-end OFDM signal; the receiving unit is configured to perform, on at least one OFDM subcarrier channel, receiving of a far-end OFDM signal sent from the far-end apparatus; the obtaining unit is configured to obtain a carrier phase difference between a near-end echo OFDM signal and the far-end OFDM signal according to the near-end echo OFDM signal generated from the sent near-end OFDM signal and according to the received far-end OFDM signal; the first adjustment unit is configured to perform a carrier phase adjustment for the near-end OFDM signal according to the carrier phase difference, so that the near-end echo OFDM signal is synchronous with the far-end OFDM signal; and the message transmission unit is configured for a near-end apparatus to send the obtained carrier phase difference to the far-end apparatus by using a carrier phase difference notification message, so that the far-end apparatus performs a carrier phase adjustment for the far-end OFDM signal according to the carrier phase difference between the near-end echo OFDM signal and the far-end OFDM signal, so as to ensure that carrier phases of the near-end echo OFDM signal and the far-end OFDM signal are synchronous. The far-end apparatus comprises a second adjustment unit, configured to perform the carrier phase adjustment for the far-end OFDM signal after obtaining the carrier phase difference notification message sent by the near-end apparatus, so that the carrier phases of the near-end echo OFDM signal and the far-end OFDM signal are synchronous. After obtaining the carrier phase difference, the near-end apparatus performs the carrier phase adjustment for the near-end OFDM signal by using the first adjustment unit, or sends the carrier phase difference notification message to the far-end apparatus by using the message transmission unit so that the far-end apparatus performs the carrier phase adjustment for the far-end OFDM signal according to the carrier phase difference between the far-end OFDM signal and the near-end echo OFDM signal, so as to achieve the purpose of synchronizing the carrier phases of the near-end echo OFDM signal and the far-end OFDM signal.

In the method, apparatus, and system for multi-carrier OFDM duplex transmission according to the embodiments of the present invention, synchronization is implemented between the far-end OFDM signal and the near-end echo OFDM signal in an echo after the carrier phase adjustment is performed for a signal to be sent, and therefore spectrum duplex transmission is implemented for a signal transmitted by using an OFDM technology, which increases spectrum usage.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
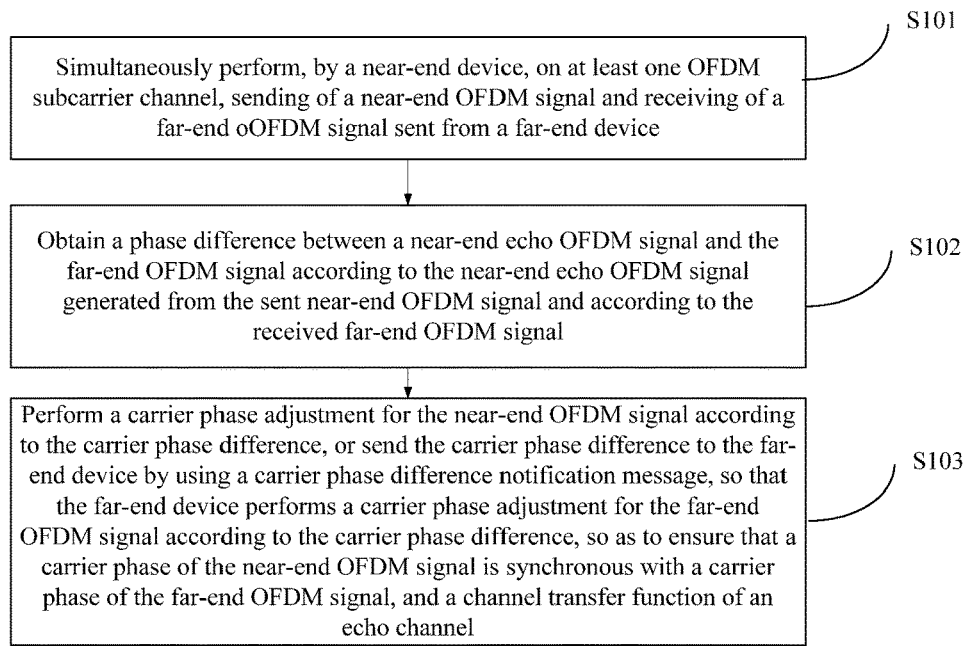
FIG. 1 is a flowchart of a method according to an embodiment of the present invention.

A method for echo cancellation in OFDM duplex transmission according to an embodiment of the present invention, as shown in FIG. 1, includes the following steps:

In step S101, simultaneously perform, by a near-end device, on at least one OFDM subcarrier channel, sending of a near-end OFDM signal and receiving of a far-end OFDM signal sent from a far-end device.

An OFDM technology is to divide a channel into several OFDM subcarrier channels. The near-end device converts a near-end signal to be sent into parallel low-speed data subflows and modulates the parallel low-speed data subflows onto the OFDM subcarrier channels to form near-end OFDM signals for transmission. Meanwhile, the near end receives far-end OFDM signals sent from a far end. The near-end OFDM signals, which are modulated by the near end onto the OFDM subcarrier channels for transmission, may be separated at the far end by using a related technology. Likewise, the far-end OFDM signals, which are modulated by the far end onto OFDM subcarrier channels for transmission, may be separated at the near end by using a related technology. This may reduce mutual interference between the OFDM subcarrier channels.

In step S102, obtain a carrier phase difference between a near-end echo OFDM signal and the far-end OFDM signal according to the near-end echo OFDM signal generated from the sent near-end OFDM signal and according to the received far-end OFDM signal.

In this embodiment, the near-end echo OFDM signal is a signal that passes through a hybrid coil and returns to the near end when the near-end OFDM signal is transmitted to the far end. The far-end OFDM signal is a signal that is sent from the far end, undergoes OFDM carrier modulation, and is transmitted to the near end.

During signal transmission, for reasons such as a latency, a carrier phase difference, denoted by $\theta_0$, is inevitably generated between the far-end OFDM signal transmitted from the far end and the near-end echo OFDM signal. Carriers of the near-end echo OFDM signal and the far-end OFDM signal are not completely synchronous. However, when carrier demodulation is performed for a carrier of a received signal, the OFDM carrier demodulation is still performed according to a carrier phase of the near-end OFDM signal. Therefore, when echo cancellation is performed, a synchronizing adjustment needs to be performed for a near-end echo cancellation signal, so that the echo cancellation signal is synchronous with the near-end echo OFDM signal after the OFDM carrier demodulation.

A channel transfer function of a near-end echo channel and the carrier phase difference between the near-end echo OFDM signal and the far-end OFDM signal are obtained. In an embodiment, a channel parameter of the received signal is obtained by using a channel estimation method, such as a process of estimating a model parameter of a certain assumed channel model from received data. The carrier phase difference $\theta_0$ between a carrier of the near-end echo OFDM signal and a carrier of the far-end OFDM signal is obtained by using the channel estimation method.

In this embodiment of the present invention, there are two solutions for obtaining the carrier phase difference between the near-end echo OFDM signal and the far-end OFDM signal and the channel transfer function of the near-end echo channel. In Solution 1, detection for a signal generated by mixing the near-end echo OFDM signal and the far-end OFDM signal, is performed and the channel estimation method is used to obtain the transfer function of the near-end echo channel and the carrier phase difference between the near-end OFDM signal and the far-end OFDM signal.

In solution 2, detection is performed separately for the near-end echo OFDM signal to obtain the transfer function of the near-end echo channel and a carrier phase of the near-end echo OFDM signal and for the far-end OFDM signal to obtain a carrier phase of the far-end OFDM signal. After calculation, the transfer function of the echo channel and the carrier phase difference between the near-end echo OFDM signal and the far-end OFDM signal is obtained.

A specific method of the solution 2 is, on one hand, channel estimation is performed for the near-end echo OFDM signal by using the channel estimation method, so as to obtain the carrier phase of the near-end echo OFDM signal or a parameter related to the carrier phase, and the transfer function of the near-end echo channel. On the other hand, estimation is performed for the far-end OFDM signal by using the channel estimation method, so as to obtain the carrier phase of the far-end OFDM signal or a parameter related to the phase. After calculation, the transfer function of the echo channel and the carrier phase difference between the near-end echo OFDM signal and the far-end OFDM signal are obtained.

In step S103, perform a carrier phase adjustment for the near-end OFDM signal according to the carrier phase difference, or send the carrier phase difference to the far-end device by using a carrier phase difference notification message, so that the far-end device performs a carrier phase adjustment for the far-end OFDM signal according to the carrier phase difference, so as to ensure that the carrier phase of the near-end echo OFDM signal is synchronous with the carrier phase of the far-end OFDM signal.

In this embodiment of the present invention, optionally, the near-end device performs the carrier phase adjustment for the near-end OFDM signal according to the carrier phase difference.

Figure 5:
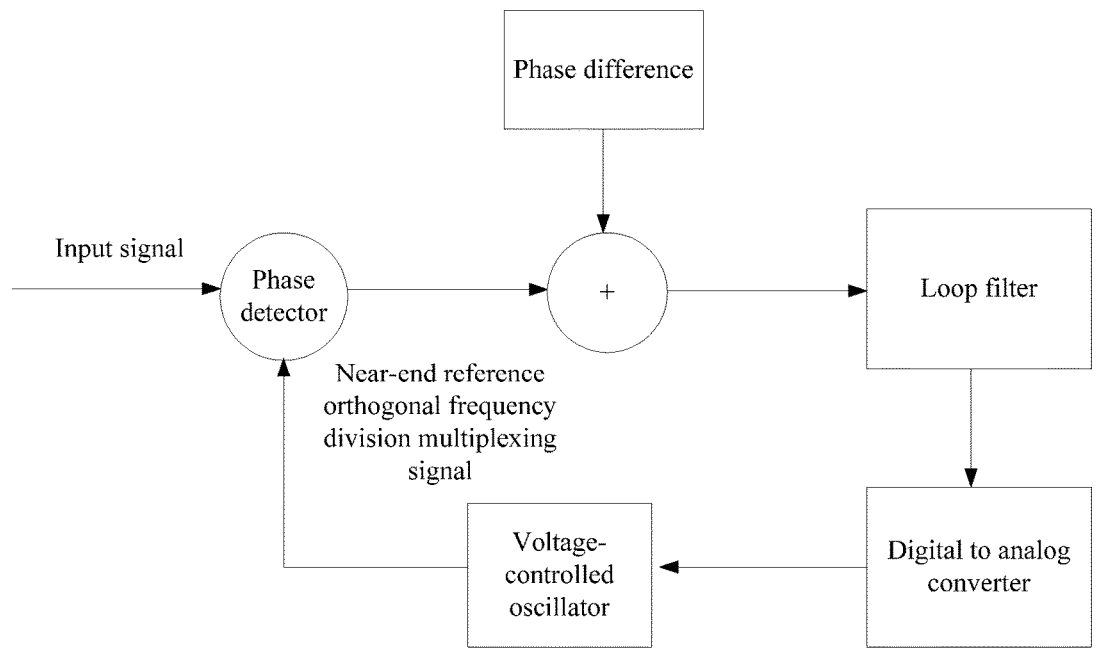
FIG. 5 is a schematic diagram of a method for a carrier phase adjustment according to an embodiment of the present invention.

As shown in FIG. 5, this embodiment of the present invention provides a method for a carrier phase adjustment. The near end generates a near-end reference OFDM signal by using a loop filter, a digital to analog converter, and a voltage-controlled oscillator according to the carrier phase difference between the far-end OFDM signal and the near-end echo OFDM signal, which is obtained from the previous step. In processes of generating and transmitting the near-end reference OFDM signal, a certain carrier phase difference may be further generated. Therefore, a carrier signal in the near-end reference OFDM signal and a carrier signal in a received signal are input into a phase detector, and the phase detector obtains the carrier phase difference between the carrier signal in the near-end reference OFDM signal and the carrier signal in the received signal. Then, a carrier phase deviation for which an adjustment needs to be performed is obtained according to a sum of the carrier phase difference between the carrier signal in the near-end reference OFDM signal and the carrier signal in the received signal and the carrier phase difference, which is obtained from the previous step, between the carrier signal in the far-end OFDM signal and the carrier signal in the near-end echo OFDM signal. The near-end reference OFDM signal is generated after the carrier signal in the near-end reference OFDM signal and the carrier signal in a received signal circularly passes through the loop filter, the digital to analog converter, and the voltage-controlled oscillator, until the sum of the carrier phase difference between the carrier signal in the near-end reference OFDM signal and the carrier signal in the received signal, which are input into the phase detector, and the carrier phase difference between the far-end OFDM signal and the near-end echo OFDM signal is zero. A frequency of the stabilized near-end reference OFDM signal is the same as the frequency of an input signal, and the carrier phase of the stabilized near-end reference OFDM signal differs from the carrier phase of the input signal by a "phase adjustment value".

Optionally, it may also be that the near-end device sends the carrier phase difference to the far-end device by using a carrier phase difference notification message, so that the far-end device performs the carrier phase adjustment for the far-end OFDM signal according to the carrier phase difference, so as to ensure that the carrier phase of the near-end echo OFDM signal is synchronous with the carrier phase of the far-end OFDM signal.

Figure 6:
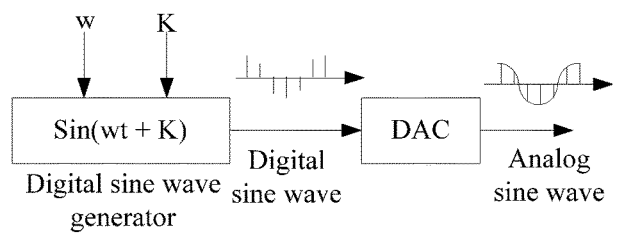
FIG. 6 is a schematic diagram of another method for a carrier phase adjustment according to an embodiment of the present invention.

As shown in FIG. 6, the far-end device needs to perform a carrier phase adjustment for the far-end OFDM signal. After the far-end device receives the carrier phase difference notification message sent by the near-end device, the far-end OFDM signal enters the digital to analog converter by using a digital sine wave, an analog sine wave is generated and used as the far-end OFDM signal for which no carrier phase adjustment is performed. The carrier phase of the output far-end OFDM signal is adjusted by modulating the carrier phase K of a digital sine wave generator, so as to equalize the K and $\theta_0$.

The near-end device sends the obtained carrier phase difference to the far-end device by using the carrier phase difference notification message and performs the carrier phase adjustment for the far-end OFDM signal to make the carrier phase difference between the near-end echo OFDM signal and the far-end OFDM signal to be zero or an integral multiple of $\pi/2$, so that the carrier phases of the near-end echo OFDM signal and the far-end OFDM signal are synchronous.

In the method for multi-carrier OFDM duplex transmission according to this embodiment of the present invention, synchronization is implemented between the far-end OFDM signal and the near-end echo OFDM signal in an echo after the carrier phase adjustment is performed for a signal to be sent, and therefore interference to the received signal caused by the near-end echo OFDM signal is prevented, and spectrum duplex transmission is implemented for a signal transmitted by using an OFDM technology, which increases spectrum usage.

Embodiment 2

Figure 2:
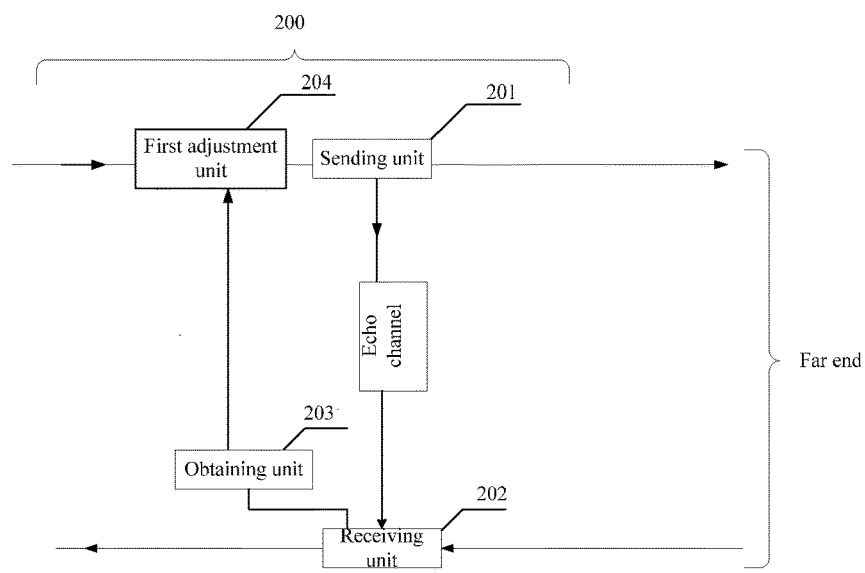
FIG. 2 is a schematic structural diagram of an apparatus according to an embodiment of the present invention.

An embodiment of the present invention provides an apparatus 200 for OFDM duplex transmission. As shown in FIG. 2, the apparatus for OFDM duplex transmission includes a sending unit 201, a receiving unit 202, an obtaining unit 203, and a first adjustment unit 204. The sending unit 201 is configured to perform, on at least one OFDM subcarrier channel, sending of a near-end OFDM signal. The receiving unit 202 is configured to perform, on at least one OFDM subcarrier channel, receiving of a far-end OFDM signal sent from a far-end device. The obtaining unit 203 is configured to obtain a carrier phase difference between a near-end echo OFDM signal and the far-end OFDM signal according to the near-end echo OFDM signal generated from the sent near-end OFDM signal and according to the received far-end OFDM signal. The first adjustment unit 204 is configured to perform a carrier phase adjustment for the near-end OFDM signal according to the carrier phase difference between the near-end echo OFDM signal and the far-end OFDM signal, so that the near-end echo OFDM signal is synchronous with the far-end OFDM signal.

Figure 3:
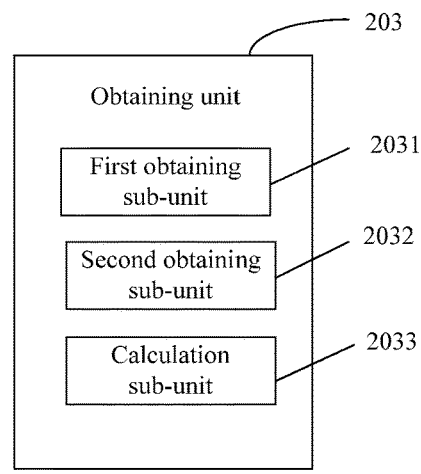
FIG. 3 is a schematic structural diagram of an obtaining unit according to an embodiment of the present invention.

Optionally, in this embodiment of the present invention, as shown in FIG. 3, the obtaining unit 203 may further include: a first obtaining sub-unit 2031, a second obtaining sub-unit 2032, and a calculation sub-unit 2033. The first obtaining sub-unit 2031 is configured to perform detection for the near-end echo OFDM signal that has passed through a hybrid coil, so as to obtain a transfer function of a near-end echo channel and a carrier phase of the near-end echo OFDM signal. The second obtaining sub-unit 2032 is configured to perform detection for the far-end OFDM signal to obtain a carrier phase of the far-end OFDM signal. The calculation sub-unit 2033 is configured to obtain the carrier phase difference between the near-end echo OFDM signal and the far-end OFDM signal after calculation.

Optionally, the apparatus in this embodiment of the present invention further includes a message transmission unit 205 configured to send the carrier phase difference to the far-end device by using a carrier phase difference notification message, so that the far-end device performs a carrier phase adjustment for the far-end OFDM signal according to the carrier phase difference, so as to ensure that the carrier phase of the near-end echo OFDM signal is synchronous with the carrier phase of the far-end OFDM signal.

In a practical application, the receiving unit 202 is further configured to perform OFDM carrier demodulation for the far-end OFDM signal. The obtaining unit 203 may be connected to the receiving unit and perform detection for a signal generated by mixing the near-end echo OFDM signal and the far-end OFDM signal to obtain the carrier phase difference between the near-end echo OFDM signal and the far-end OFDM signal. The first adjustment unit 204 is arranged on a near-end device side, and is further configured to adjust the carrier phases to make the carrier phase difference to be zero or an integral multiple of π/2, so that the carrier phase of the echo carrier signal is synchronous with the carrier phase of the far-end carrier signal.

In the apparatus for multi-carrier OFDM duplex transmission according to this embodiment of the present invention, synchronization is implemented between the far-end OFDM signal and the near-end echo OFDM signal in an echo after the carrier phase adjustment is performed for a signal to be sent, and therefore interference to the received signal caused by the near-end echo OFDM signal is prevented, and spectrum duplex transmission is implemented for a signal transmitted by using an OFDM technology, which increases spectrum usage.

Embodiment 3

Figure 4:
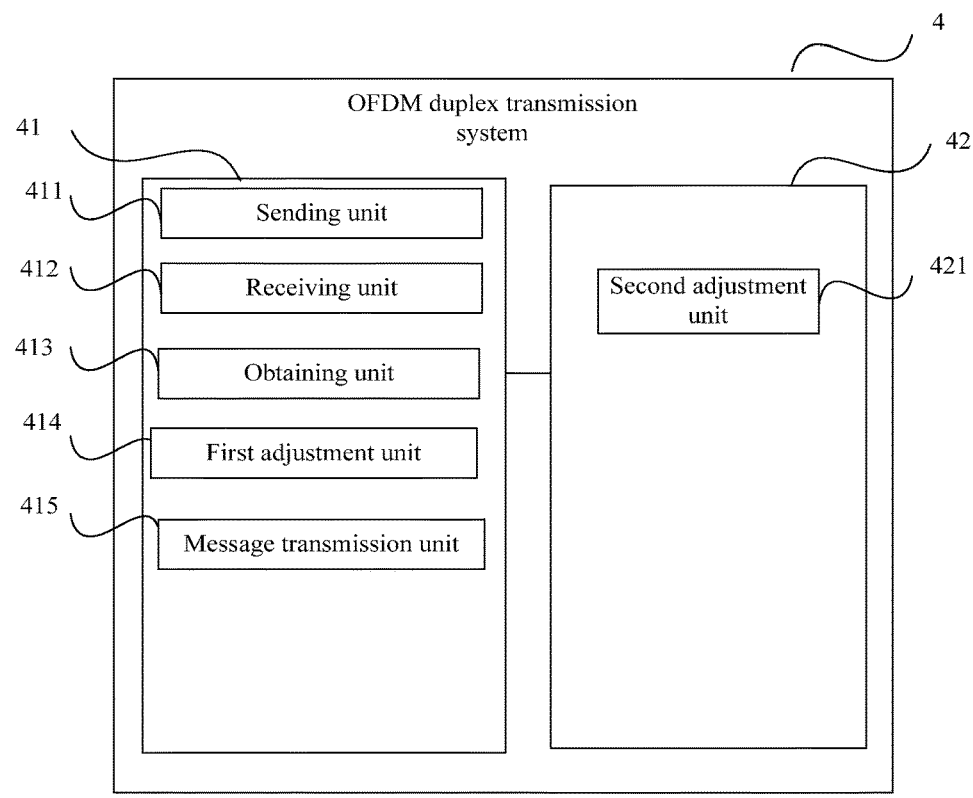
FIG. 4 is a schematic structural diagram of a system according to an embodiment of the present invention.

An embodiment of the present invention provides a system 4 for multi-carrier OFDM duplex transmission. As shown in FIG. 4, the system includes: a near-end apparatus 41 and a far-end apparatus 42. The near-end apparatus 41 comprises a sending unit 411, a receiving unit 412, an obtaining unit 413, a first adjustment unit 414, and a message transmission unit 415. The sending unit 411 is configured to perform, on at least one OFDM subcarrier channel, sending of a near-end OFDM signal. The receiving unit 412 is configured to perform, on at least one OFDM subcarrier channel, receiving of a far-end OFDM signal. The obtaining unit 413 is configured to obtain a carrier phase difference between a near-end echo OFDM signal and the far-end OFDM signal according to the near-end echo OFDM signal generated from the sent near-end OFDM signal and according to the received far-end OFDM signal. The first adjustment unit 414 is configured to perform a carrier phase adjustment for the near-end OFDM signal according to the carrier phase difference between the near-end echo OFDM signal and the far-end OFDM signal, so that the near-end echo OFDM signal is synchronous with the far-end OFDM signal. The message transmission unit 415 is configured for a near-end device to send the obtained carrier phase difference between the near-end echo OFDM signal and the far-end OFDM signal to a far-end device by using a carrier phase difference notification message, so that the far-end device performs a carrier phase adjustment for the far-end OFDM signal according to the carrier phase difference between the near-end echo OFDM signal and the far-end OFDM signal, so as to make the carrier phase difference between the near-end echo OFDM signal and the far-end OFDM signal to be zero or an integral multiple of π/2, so that carrier phases of the near-end echo OFDM signal and the far-end OFDM signal are synchronous. The far-end apparatus 42 includes a second adjustment unit 421, configured to perform the carrier phase adjustment for the far-end OFDM signal after obtaining the carrier phase difference notification message sent by the near-end device, so that the near-end echo OFDM signal is synchronous with the far-end OFDM signal. After obtaining the carrier phase difference between the far-end OFDM signal and the near-end echo OFDM signal, the near-end apparatus 41 performs the carrier phase adjustment for the near-end OFDM signal by using the first adjustment unit, or sends the carrier phase difference notification message to the far-end apparatus 42 by using the message transfer unit 415 so that the far-end apparatus 42 performs the carrier phase adjustment for the far-end OFDM signal according to the carrier phase difference between the far-end OFDM signal and the near-end echo OFDM signal, so as to achieve the purpose of synchronizing the near-end echo OFDM signal with the far-end OFDM signal.

In the system for multi-carrier OFDM duplex transmission according to this embodiment of the present invention, synchronization is implemented between the far-end OFDM signal and the near-end echo OFDM signal in an echo after the carrier phase adjustment is performed for a signal to be sent, and therefore interference to the received signal caused by the near-end echo OFDM signal is prevented, and spectrum duplex transmission is implemented for a signal transmitted by using an OFDM technology, which increases spectrum usage.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A method for multi-carrier orthogonal frequency division multiplexing (OFDM) duplex transmission, the method comprising:
   simultaneously performing, by a near-end device, on a first OFDM subcarrier channel, sending of a near-end OFDM signal and receiving of a far-end OFDM signal sent from a far-end device;
   calculating a carrier phase difference value between a near-end echo OFDM signal and the far-end OFDM signal according to the near-end echo OFDM signal generated from the sent near-end OFDM signal and according to the received far-end OFDM signal, wherein the near-end echo OFDM signal generated from the sent near-end OFDM signal comprises a signal that returns to the near-end device when the near-end OFDM signal is sent by the near-end device; and
   synchronizing a carrier phase of the near-end echo OFDM signal with a carrier phase of the far-end OFDM signal using the calculated carrier phase difference value;

wherein the synchronizing comprises:
  performing a carrier phase adjustment for the near-end OFDM signal according to the carrier phase difference value; or
  sending the carrier phase difference value to the far-end device by using a carrier phase difference notification message, wherein the far-end device performs a carrier phase adjustment for the far-end OFDM signal according to the carrier phase difference value.

2. The method according to claim 1, wherein the calculating a carrier phase difference value between a near-end echo OFDM signal and the far-end OFDM signal comprises performing detection for the near-end echo OFDM signal and the received far-end OFDM signal to use to calculate the carrier phase difference value between the near-end echo OFDM signal and the far-end OFDM signal.

3. The method according to claim 1, wherein the calculating a carrier phase difference value between a near-end echo OFDM signal and the far-end OFDM signal comprises:
  separately performing detection for the near-end echo OFDM signal to obtain the carrier phase of the near-end echo OFDM signal and performing detection for the far-end OFDM signal to obtain the carrier phase of the far-end OFDM signal; and
  calculating the carrier phase difference value between the near-end echo OFDM signal and the far-end OFDM signal.

4. The method according to claim 1, wherein the synchronizing comprises performing the carrier phase adjustment for the near-end OFDM signal according to the carrier phase difference value, and performing the carrier phase adjustment comprises performing the carrier phase adjustment for the near-end OFDM signal to make the carrier phase difference value between the near-end echo OFDM signal and the far-end OFDM signal to be zero or an integral multiple of $\pi/2$.

5. The method according to claim 1, wherein the synchronizing comprises sending the carrier phase difference value to the far-end device; and
  wherein the far-end device performs the carrier phase adjustment for the far-end OFDM signal according to the carrier phase difference value by performing the carrier phase adjustment for the far-end OFDM signal according to the carrier phase difference value to make the carrier phase difference value between the near-end echo OFDM signal and the far-end OFDM signal to be zero or an integral multiple of $\pi/2$.

6. The method according to claim 1, further comprising:
  performing an OFDM carrier demodulation of a near-end echo cancellation signal, according to a synchronized carrier phase for the near-end echo cancellation signal, wherein the synchronized carrier phase is the carrier phase of the near-end echo OFDM signal that is adjusted according to the carrier phase difference value; and
  cancelling echo on an OFDM carrier demodulation of the far-end OFDM signal with the OFDM carrier demodulation of the near-end echo cancellation signal.

7. The method according to claim 1, further comprising:
  performing, by the far-end device, an echo cancellation on the near-end OFDM signal, after synchronizing the carrier phase of the near-end echo OFDM signal with the carrier phase of the far-end OFDM signal.

8. The method according to claim 1, wherein the near-end echo OFDM signal is generated by the sent near-end OFDM signal from the signal that returns to the near-end device, after the signal has passed through a hybrid coil in the near-end device when the near-end OFDM signal is sent by the near-end device.

9. An apparatus for multi-carrier orthogonal frequency division multiplexing (OFDM) duplex transmission, comprising:
  a sender configured to perform, on a first OFDM subcarrier channel, sending of a near-end OFDM signal;
  a receiver configured to perform, on the first OFDM subcarrier channel, receiving of a far-end OFDM signal sent from a far-end device;
  a first phase detector configured to mix the near-end OFDM signal and a near-end reference OFDM signal to obtain a first carrier phase difference value between the near-end OFDM signal and the near-end reference OFDM signal;
  a first additive mixer coupled to the first phase detector and configured to add the first carrier phase difference value and a second carrier phase difference value to obtain a carrier phase deviation for which a carrier phase adjustment is to be performed, wherein the second carrier phase difference value is between a near-end echo OFDM signal generated from the sent near-end OFDM signal and the far-end OFDM signal, and wherein the near-end echo OFDM signal generated from the sent near-end OFDM signal comprises a signal that returns to the apparatus when the near-end OFDM signal is sent by the sender; and
  a voltage-controlled oscillator coupled to the first phase detector and configured to perform the carrier phase adjustment for the near-end OFDM signal using the carrier phase deviation, wherein after the carrier phase adjustment of the near-end OFDM signal a carrier phase of the near-end echo OFDM signal is synchronized with a carrier phase of the far-end OFDM signal.

10. The apparatus according to claim 9, further comprising a second phase detector coupled to the first additive mixer and configured to perform detection for the near-end echo OFDM signal and the received far-end OFDM signal.

11. The apparatus according to claim 9, further comprising:
  a second phase detector configured to perform detection for the near-end echo OFDM signal to obtain a carrier phase of the near-end echo OFDM signal; and
  a third phase detector configured to perform detection for the far-end OFDM signal to obtain a carrier phase of the far-end OFDM signal.

12. The apparatus according to claim 11, further comprising a second additive mixer coupled to the first additive mixer and comprising a first input coupled to the second phase detector and a second input coupled to the third phase detector, the second additive mixer being configured to calculate the second carrier phase difference value between the near-end echo OFDM signal and the far-end OFDM signal.

13. The apparatus according to claim 9, wherein the voltage-controlled oscillator is further configured to perform the carrier phase adjustment for the near-end OFDM signal to make the second carrier phase difference value between the near-end echo OFDM signal and the far-end OFDM signal to be zero or an integral multiple of $\pi/2$.

14. The apparatus according to claim 9, wherein the apparatus further comprises a message transmitter configured to send the second carrier phase difference value to the far-end device by using a carrier phase difference notification message, so that the far-end device performs a phase adjustment for the far-end OFDM signal according to the second carrier phase difference value, for synchronizing a carrier phase of the near-end echo OFDM signal with a carrier phase of the far-end OFDM signal.

15. The apparatus according to claim 9, further comprising loop filter coupled to the first additive mixer and the voltage-controlled oscillator, wherein the loop filter and the voltage-controlled oscillator are configured to
generate the near-end reference OFDM signal, and
transmit the near-end reference OFDM signal to the first phase detector.

16. A system for multi-carrier orthogonal frequency division multiplexing (OFDM) duplex transmission, the system comprising:
a near-end apparatus, wherein the near-end apparatus comprises a sender, a receiver, a first phase detector, a first additive mixer, a first voltage-controlled oscillator, and a message transmitter, wherein:
the sender is configured to perform, on a first OFDM subcarrier channel, sending of a near-end OFDM signal;
the receiver is configured to perform, on the first OFDM subcarrier channel, receiving of a far-end OFDM signal sent from a far-end apparatus;
the first phase detector is configured to mix the near-end OFDM signal and a near-end reference OFDM signal to obtain a first carrier phase difference value between the near-end OFDM signal and the near-end reference OFDM signal;
the first additive mixer is configured to add the first carrier phase difference value and a second carrier phase difference value to obtain a carrier phase deviation for which a carrier phase adjustment is to be performed, wherein the second carrier phase difference value is between a near-end echo OFDM signal generated from the sent near-end OFDM signal and the far-end OFDM signal, and wherein the near-end echo OFDM signal generated from the sent near-end OFDM signal comprises a signal that returns to the near-end apparatus when the near-end OFDM signal is sent by the near-end apparatus;
the first voltage-controlled oscillator is configured to perform the carrier phase adjustment for the near-end OFDM signal using the carrier phase deviation, wherein performing the carrier phase adjustment of the near-end OFDM signal causes a carrier phase of the near-end echo OFDM signal to be synchronized with a carrier phase of the far-end OFDM signal; and
the message transmitter is configured for the near-end apparatus to send the second carrier phase difference value to the far-end apparatus by using a carrier phase difference notification message, wherein the far-end apparatus performs a carrier phase adjustment for the far-end OFDM signal according to the second carrier phase difference value between the near-end echo OFDM signal and the far-end OFDM signal, for synchronizing carrier phases of the near-end echo OFDM signal and the far-end OFDM signal; and
a far-end apparatus comprising: a second voltage-controlled oscillator configured to perform a carrier phase adjustment for the far-end OFDM signal after obtaining the carrier phase difference notification message sent by the near-end apparatus, for synchronizing the carrier phases of the near-end echo OFDM signal and the far-end OFDM signal.

17. The system according to claim 16, wherein the near-end apparatus further comprises a second phase detector configured to perform detection for the near-end echo OFDM signal and the received far-end OFDM signal.

18. The system according to claim 16, wherein the near-end apparatus further comprises
a second phase detector configured to perform detection for the near-end echo OFDM signal to obtain a carrier phase of the near-end echo OFDM signal; and
a third phase detector configured to perform detection for the far-end OFDM signal to obtain a carrier phase of the far-end OFDM signal.

19. The system according to claim 18, wherein the near-end apparatus further comprises a second additive mixer configured to calculate the second carrier phase difference value between the near-end echo OFDM signal and the far-end OFDM signal.

20. The system according to claim 16, wherein the first voltage-controlled oscillator is further configured to perform the carrier phase adjustment for the near-end OFDM signal to make the second carrier phase difference value between the near-end echo OFDM signal and the far-end OFDM signal to be zero or an integral multiple of $\pi/2$.

* * * * *